(12) United States Patent
Tsubakimoto et al.

(10) Patent No.: US 10,279,459 B2
(45) Date of Patent: May 7, 2019

(54) POWER TOOL

(71) Applicant: Panasonic Intellectual Property Management Co., Ltd., Osaka (JP)

(72) Inventors: Hiroyuki Tsubakimoto, Mie (JP); Hidenori Shimizu, Mie (JP); Kenji Nakayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 15/454,366

(22) Filed: Mar. 9, 2017

(65) Prior Publication Data

US 2017/0259413 A1    Sep. 14, 2017

(30) Foreign Application Priority Data

Mar. 10, 2016 (JP) ................. 2016-047515

(51) Int. Cl.
*B23B 31/40* (2006.01)
*B25B 21/02* (2006.01)
*B25B 23/00* (2006.01)

(52) U.S. Cl.
CPC .......... *B25B 23/0035* (2013.01); *B23B 31/40* (2013.01); *B25B 21/02* (2013.01); *B23B 2231/46* (2013.01)

(58) Field of Classification Search
CPC . B23B 31/40; B23B 2231/46; B25B 23/0035; B25B 21/02
See application file for complete search history.

(56) References Cited

U.S. PATENT DOCUMENTS

| | | | | |
|---|---|---|---|---|
| 3,180,435 A * | 4/1965 | McHenry | ............ | B25B 23/0035 173/131 |
| 5,050,467 A * | 9/1991 | Brown | ................ | B25B 23/0035 403/325 |
| 5,595,099 A * | 1/1997 | Pusateri | ................... | B25B 21/02 279/97 |
| 7,036,406 B2 * | 5/2006 | Milbourne | ............ | B25B 15/001 173/93.5 |
| 7,249,638 B2 * | 7/2007 | Bodine | ................... | B25B 21/02 173/104 |
| 8,667,875 B2 * | 3/2014 | Haman | ................... | B25B 21/02 279/76 |
| 8,839,879 B2 * | 9/2014 | Elger | ..................... | B25B 21/02 173/128 |
| 9,669,526 B2 * | 6/2017 | Ely | ..................... | B25B 23/0035 |
| 2012/0325509 A1 * | 12/2012 | Puzio | ..................... | B25B 21/02 173/90 |
| 2018/0207774 A1 * | 7/2018 | Funk | ................... | B25B 23/0035 |

FOREIGN PATENT DOCUMENTS

JP    2015-193062 A    11/2015

* cited by examiner

*Primary Examiner* — David B. Thomas
(74) *Attorney, Agent, or Firm* — McDermott Will & Emery LLP

(57) ABSTRACT

A holding pin protrudes from a first opening of a through hole, enters a hole formed in a tip tool, and holds the tip tool. A spring member energizes the holding pin. A bush is press-fitted in the through hole and supports the spring member at a first end portion thereof. An inner diameter of a second opening of the through hole is formed larger than an outer diameter of the bush. As a result of this, a second end portion of the bush is arranged to avoid contact with the second opening of the through hole.

6 Claims, 7 Drawing Sheets

POWER TOOL

CROSS-REFERENCE TO RELATED APPLICATIONS

This application is based upon and claims the benefit of priority of Japanese Patent Application Number 2016-47515, filed on Mar. 10, 2016, the entire contents of which are hereby incorporated by reference.

BACKGROUND

1. Field of the Disclosure

The disclosure relates to a power tool including a tool mounter to which a tip tool is mounted.

2. Description of the Related Art

A tip portion of an output shaft in an impact rotary tool is mounted with a socket body used for fastening a screw part such as a bolt or a nut. A rectangular hole is formed on a rear end side of the socket body. Fitting a tip portion of the output shaft having a rectangular cross-sectional shape into the rectangular hole of the socket body results in mounting the socket body to the impact rotary tool (see Japanese Unexamined Patent Application Publication No. 2015-193062, for example).

It is desirable that a socket body is held to the output shaft without falling after mounted to the output shaft of the impact rotary tool. Various mechanisms for preventing falling of the socket body have been proposed in the related art. It is preferable that a failed part is replaceable when a failure such as damage occurs in a falling prevention mechanism.

It is also important to configure a falling prevention mechanism in such a manner as to prevent disadvantageously influencing the strength of an output shaft since the output shaft of an impact rotary tool is transferred with rotary stroke impact from an impact mechanism.

SUMMARY

One aspect of the present invention has been devised in consideration to such circumstances. An object of one aspect of the present invention is to provide a suitable falling prevention mechanism that prevents a tip tool such as a socket body from falling.

In order to solve the above problem, an embodiment of the present invention relates to a power tool including a tool mounter to which a tip tool is mounted. The tool mounter is formed with a through hole in a direction different from a shaft direction. The through hole is disposed with: a holding pin that protrudes from a first opening of the through hole, enters a hole formed in the tip tool, and holds the tip tool; a spring member that energizes the holding pin; and a bush press-fitted in the through hole and supporting the spring member at a first end portion thereof. A second end portion of the bush is not in contact with a second opening of the through hole.

Another embodiment of the present invention also relates to a power tool including a tool mounter to which a tip tool is mounted. The tool mounter is formed with a through hole in a direction different from a shaft direction. The through hole is disposed with: a holding pin that protrudes from an opening of the through hole, enters a hole formed in the tip tool, and holds the tip tool; a spring member that energizes the holding pin; and a supporting member that supports the spring member. A groove portion is formed on an outer surface of the supporting member in a circumferential direction. An elastic member is arranged in the groove portion and engaged with the through hole.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

One aspect of the present invention will now be described by reference to the preferred embodiments. This does not intend to limit the scope of one aspect of the present invention, but to exemplify the teachings.

Figure 1:
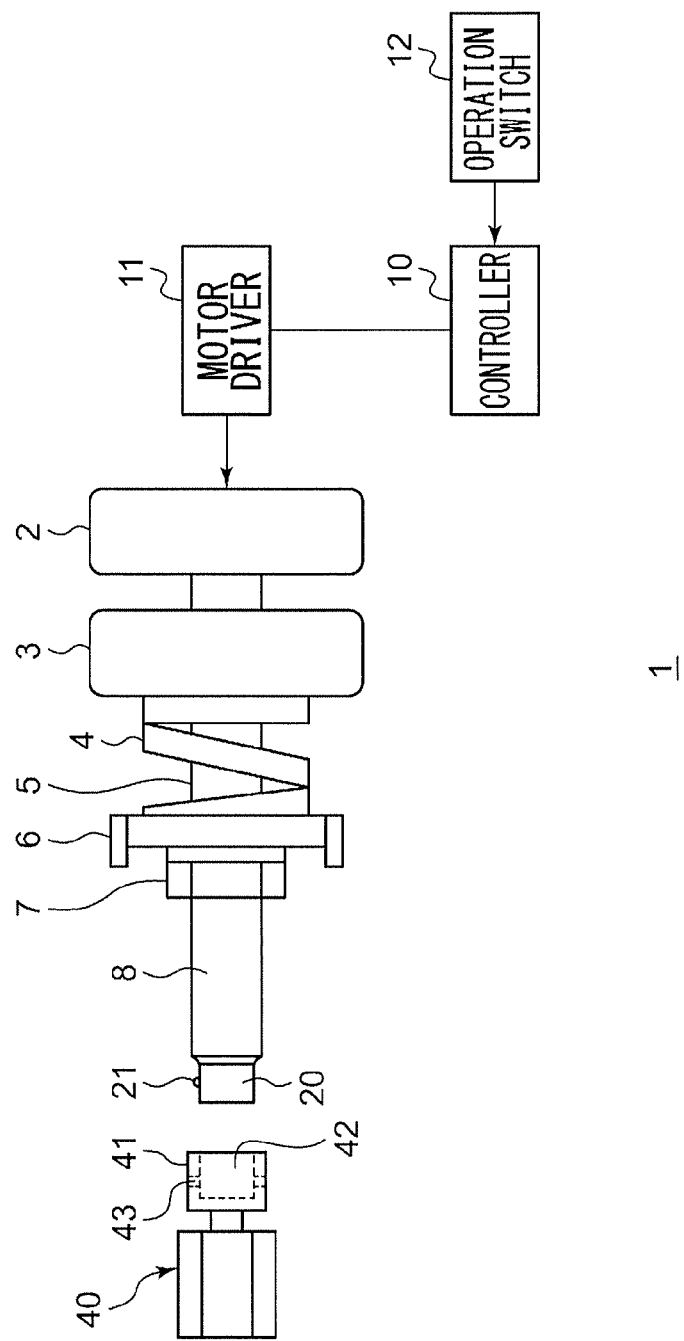
FIG. 1 is a diagram of a configuration of a power tool according to an embodiment of the present invention.

FIG. 1 is a diagram illustrating a configuration of a power tool according to an embodiment of the present invention. In a power tool 1, power is supplied from a charging battery incorporated in a battery pack. FIG. 1 illustrates the power tool 1 including an impact mechanism; however, the power tool 1 may be a rotary tool without an impact mechanism.

A motor 2 which is a driving source is driven by a motor driver 11. Rotational output of the motor 2 is decelerated by a speed reducer 3 and thereby transferred to a driving shaft 5. The driving shaft 5 is connected with a hammer 6 via a cam mechanism (not illustrated) and the hammer 6 is energized toward an anvil 7 provided with an output shaft 8 by a spring 4.

When force of more than or equal to a predetermined value does not act between the hammer 6 and the anvil 7, the hammer 6 and the anvil 7 are maintained in an engaged state by the spring 4 where the hammer 6 transfers rotation of the driving shaft 5 to the anvil 7. When force of more than or equal to a predetermined value acts between the hammer 6 and the anvil 7, however, the hammer 6 recedes against the spring 4 and the engaged state of the hammer 6 and the anvil 7 is canceled. Thereafter, by being energized by the spring 4 and guided by the cam mechanism, the hammer 6 advances while rotating and applies stroke impact (impact) to the anvil 7 in a rotation direction. In the power tool 1, the spring 4, the driving shaft 5, and the hammer 6 form the impact mechanism that applies stroke impact to the anvil 7 and the output shaft 8.

A controller 10 is formed by a microcomputer or the like mounted on a control substrate and controls rotation of the motor 2. An operation switch 12 is a trigger switch operated by a user. The controller 10 controls on/off of the motor 2 based on operation of the operation switch 12 and supplies a driving command to the motor driver 11 corresponding to an operation amount of the operation switch 12. The motor driver 11 adjusts a voltage applied to the motor 2 by the driving command supplied from the controller 10 and thereby adjusts the number of revolutions of the motor.

A tip portion of the output shaft 8 is formed as a tool mounter 20 to which a socket body 40 that is a tip tool is mounted. The tool mounter 20 has a rectangular cross-section in a direction perpendicular to a direction of rotation axis and a predetermined length in the direction of rotation axis. The socket body 40 is formed with a rectangular hole 42 at a connecting portion 41 on a rear end side thereof. Fitting the tool mounter 20 into the rectangular hole 42 results in connecting the socket body 40 to the power tool 1. The socket body 40 includes a rectangular hole that receives a fastened member such as a head portion of a bolt or a nut on a tip side thereof.

Figure 2:
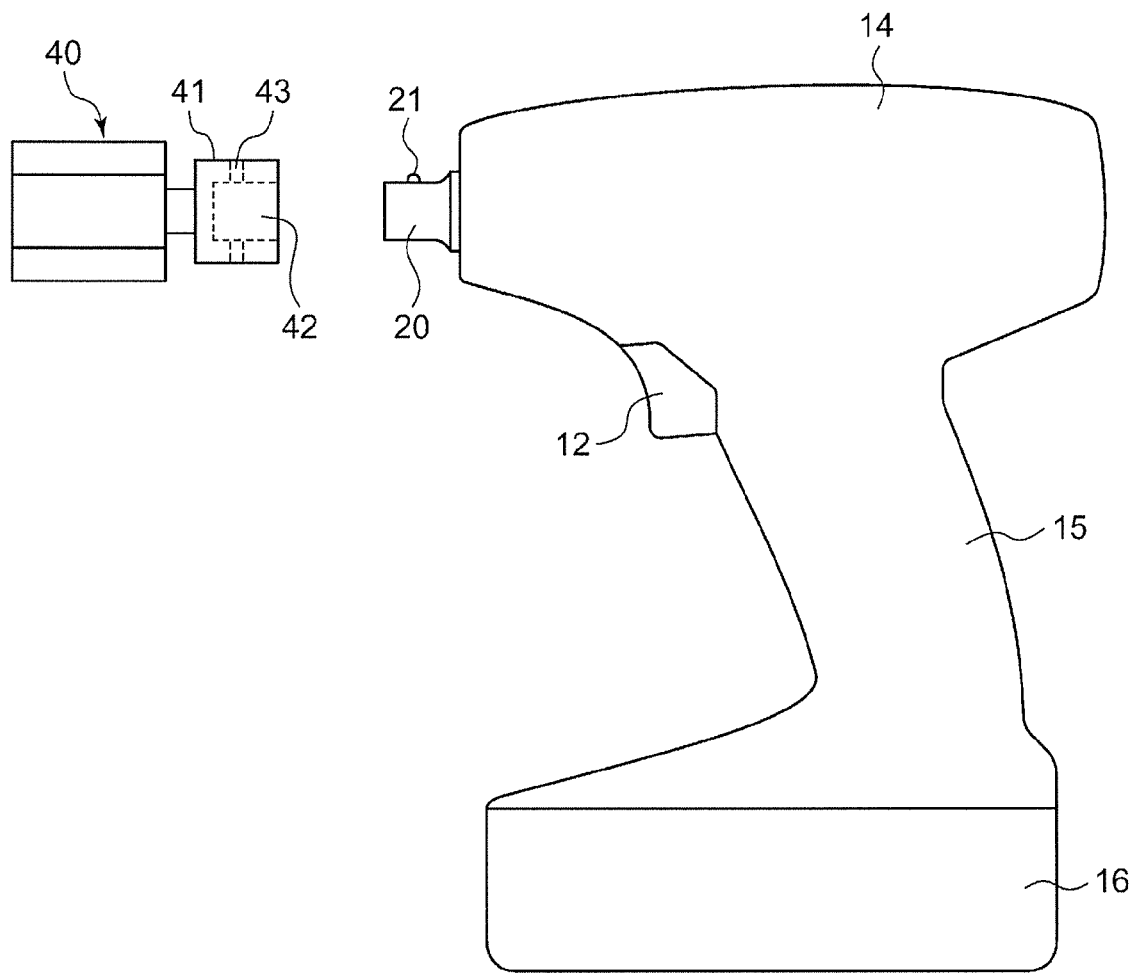
FIG. 2 is a diagram illustrating an outer structure of the power tool.

FIG. 2 is a diagram illustrating an outer structure of the power tool 1. A housing that forms an exterior structure of the power tool 1 includes a body portion 14 of a cylindrical shape with a bottom and a gripping portion 15 extending downward from the body portion 14. The gripping portion 15 forms a grip for a user to hold. A lower end portion of the gripping portion 15 is attached with a battery pack 16 formed by a storage case of a box shape. A front surface of the gripping portion 15 is formed with the operation switch 12 that a user operates.

In the body portion 14 a power transmission mechanism including at least from the motor 2 to the output shaft 8 illustrated in FIG. 1 is disposed. The tool mounter 20 that is the tip portion of the output shaft 8 protrudes outside the body portion 14 and is mounted with the socket body 40. The tool mounter 20 is formed with a through hole in a direction different from the direction of rotation axis. The through hole accommodates a holding pin 21 energized by a spring member.

The connecting portion 41 of the socket body 40 is formed with a hole 43 in a direction different from the shaft direction. The hole 43 is a through hole penetrating from an outer surface of the connecting portion 41 to the rectangular hole 42. The direction in which the hole 43 is formed in the connecting portion 41 is determined to be in the same direction as that of the through hole accommodating the holding pin 21 in the tool mounter 20 when the connecting portion 41 is connected to the tool mounter 20.

When the tool mounter 20 fits into the rectangular hole 42 of the connecting portion 41, a head portion of the holding pin 21 protruding from the through hole of the tool mounter 20 enters the hole 43 of the connecting portion 41. This limits movement of the socket body 40 in the shaft direction, thereby preventing the socket body 40 from falling off the tool mounter 20. Note that, in order to detach the socket body 40 from the tool mounter 20, it is only required to push the holding pin 21 by a stick-shaped member made of metal from the hole 43 of the connecting portion 41 to disengage the holding pin 21 and the hole 43 and to pull out the socket body 40 in the shaft direction.

In the embodiment, as described above, the holding pin 21 that enters the hole 43 of the socket body 40 is used as the falling prevention mechanism of the socket body 40. This holding pin 21 is also called a detent pin. The falling prevention mechanism according to embodiments will be described below.

Figure 3:
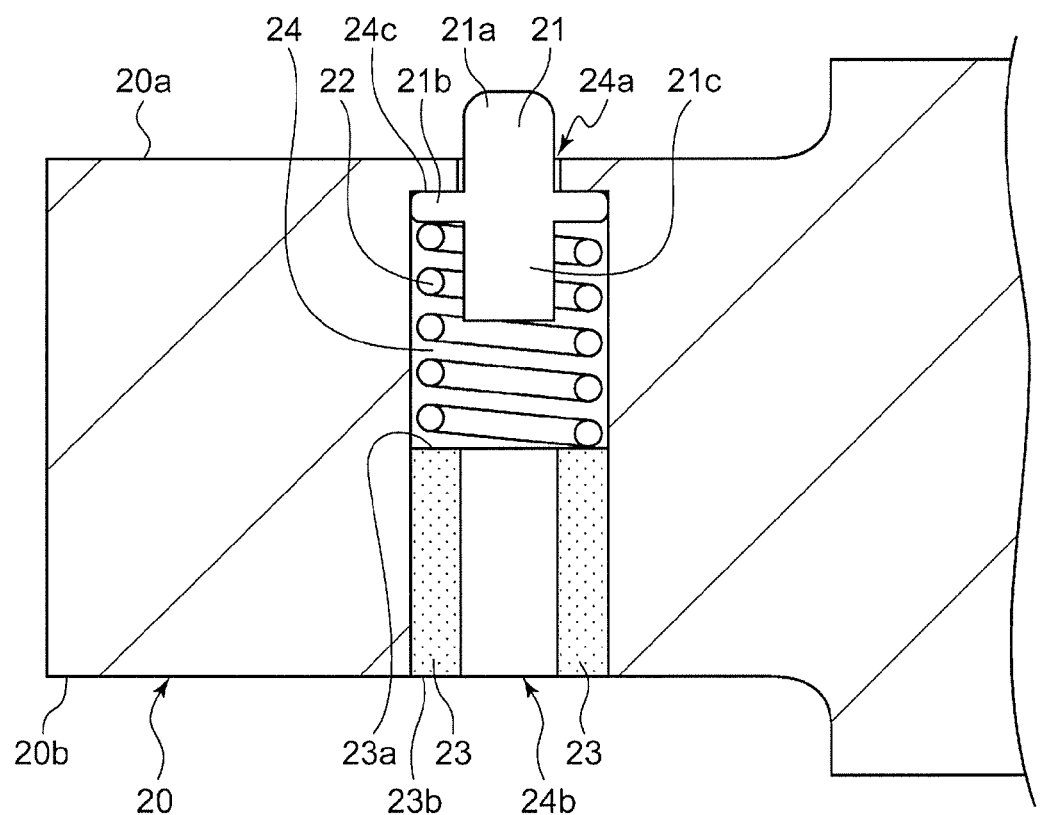
FIG. 3 is a diagram of a structure of a falling prevention mechanism according to one embodiment.

FIG. 3 is a diagram illustrating a structure of a falling prevention mechanism according to a first embodiment. In a tool mounter 20, a through hole 24 has a round cross-section and is formed in a direction perpendicular to a direction of rotation axis. The tool mounter 20 has a quadratic prism shape extending in the direction of rotation axis and the through hole 24 may be formed while vertically penetrating two surfaces opposite to each other. In the illustrated example, an opening on a side where a head portion 21a of a holding pin 21 protrudes from is referred to as a "first opening 24a" while an opening on the opposite side is referred to as a "second opening 24b". A diameter of the first opening 24a is smaller than a diameter of the second opening 24b in order to hold the holding pin 21 in the through hole 24.

The falling prevention mechanism of the first embodiment includes the through hole 24, the holding pin 21 disposed within the through hole 24, a spring member 22, and a bush 23. For convenience of descriptions, the falling prevention mechanism is described using vertical positions in the drawing. A surface of the tool mounter 20 where the first opening 24a is formed is referred to as an "upper surface 20a" and a surface of the tool mounter 20 where the second opening 24b is formed is referred to as a "lower surface 20b".

The holding pin 21 includes the head portion 21a, a flange portion 21b having a diameter larger than that of the head portion 21a, and a leg portion 21c having a diameter smaller than that of the flange portion 21b. The holding pin 21 has a shape symmetric with respect to an axis with the head portion 21a, the flange portion 21b, and the leg portion 21c connected coaxially. The spring member 22 is a coil spring and energizes the holding pin 21. The bush 23 is a cylindrical member made of metal and supports the spring member 22 at a first end portion 23a thereof while press-fitted in the through hole 24.

The spring member 22 is disposed between a lower surface of the flange portion 21b of the holding pin 21 and the first end portion 23a of the bush 23. As a result of this, the spring member 22 energizes the holding pin 21 toward the first opening 24a. A diameter of the flange portion 21b is formed larger than that of the first opening 24a and thus an upper surface of the flange portion 21b abuts against a protruding portion 24c protruding inward in the through hole 24.

When the socket body 40 is mounted to the tool mounter 20, the head portion 21a of the holding pin 21 protruding from the first opening 24a enters the hole 43 of the socket body 40 and thereby holds the socket body 40. This prevents the socket body 40 from falling. Energizing force of the spring member 22 is preferably large in order to maintain protruding posture of the head portion 21a of the holding pin 21. Meanwhile, a user needs to push the head portion 21a into the through hole 24 when the socket body 40 is removed from the tool mounter 20. The energizing force of the spring member 22 is, therefore, set at a level that allows for maintaining the protruding posture of the head portion 21a while the user is allowed to push the head portion 21a into the through hole 24.

Figure 4:
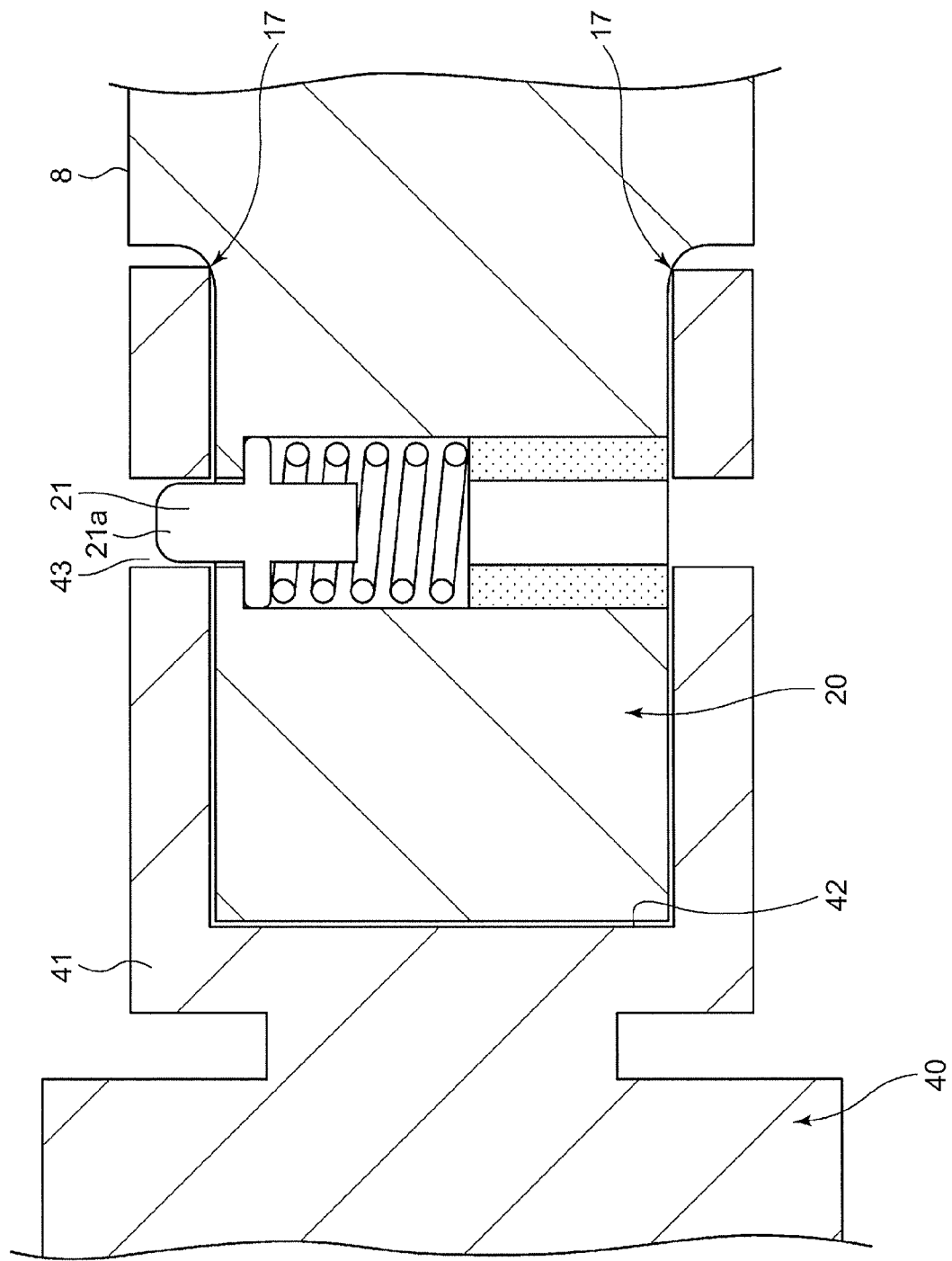
FIG. 4 is a diagram illustrating a state where a socket body is mounted to a tool mounter.

FIG. 4 is a diagram illustrating a state where the socket body 40 is mounted to the tool mounter 20. In this state, the head portion 21a of the holding pin 21 enters the hole 43 of the connecting portion 41 and thereby prevents falling of the socket body 40. Note that the connecting portion 41 and the output shaft 8 are in contact with each other at an abutting position 17 in the direction of rotation axis. Design is made such that reaction force from the socket body 40 is received at the abutting position 17 and that the head portion 21a does not receive the reaction force while the power tool 1 is in operation.

The falling prevention mechanism of the first embodiment is formed by inserting the holding pin 21 and the spring member 22 from the second opening 24b into the through hole 24 and then press-fitting the bush 23 from the second opening 24*b* until a second end portion 23*b* of the bush 23 reaches the lower surface 20*b*. When a failure such as damage occurs in this falling prevention mechanism, for example pushing a stick-shaped member into the through hole 24 from the first opening 24*a* by a machine that generates large pushing force results in releasing press-fitting and fixing of the bush 23 in the through hole 24 and the components are removed from the second opening 24*b*. The falling prevention mechanism of the first embodiment has a structure that allows for easy replacement of the components.

Figure 5:
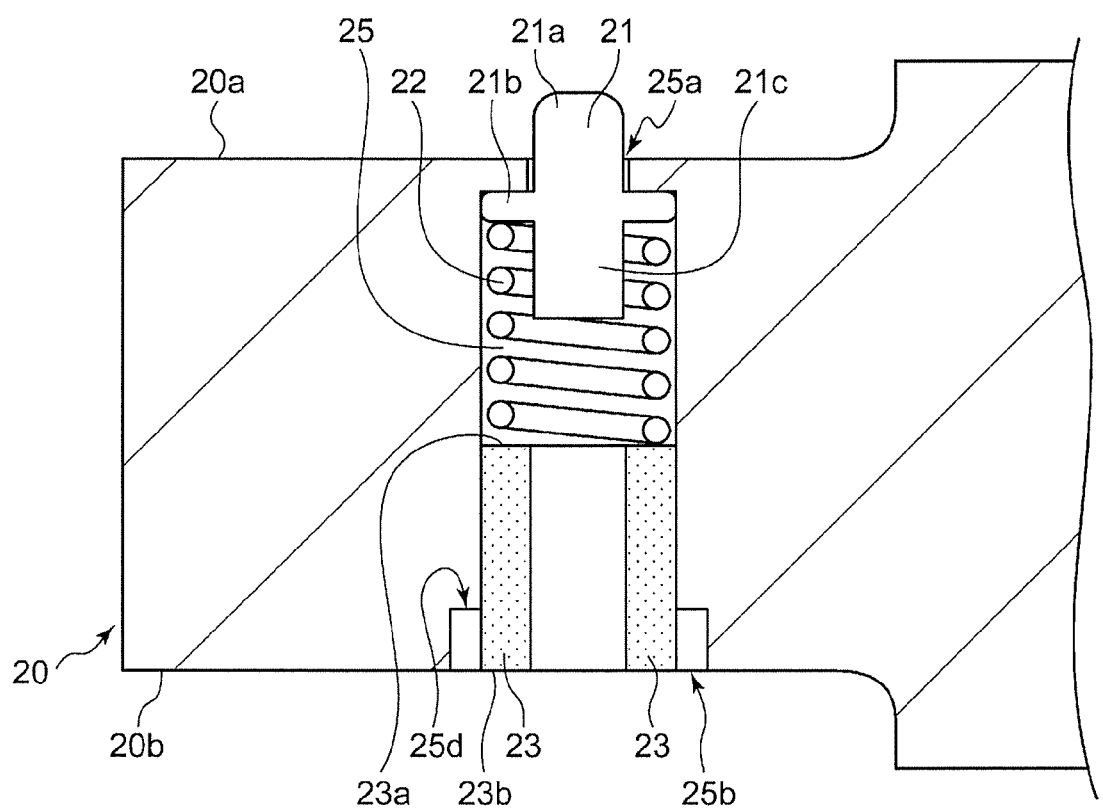
FIG. 5 is a diagram of a structure of a falling prevention mechanism according to one embodiment.

FIG. 5 is a diagram illustrating a structure of a falling prevention mechanism according to a second embodiment. In a tool mounter 20, a through hole 25 has a round cross-section and is formed in a direction perpendicular to a direction of rotation axis. The tool mounter 20 has a quadratic prism shape extending in the direction of rotation axis and the through hole 25 may be formed while vertically penetrating an upper surface 20*a* and a lower surface 20*b* opposite to each other. In the illustrated example, an opening on the upper surface 20*a* side where a head portion 21*a* of a holding pin 21 protrudes from is referred to as a "first opening 25*a*" while an opening on the lower surface 20*b* side is referred to as a "second opening 25*b*". A diameter of the first opening 25*a* is smaller than a diameter of the second opening 25*b*.

The falling prevention mechanism of the second embodiment includes the through hole 25, the holding pin 21 disposed within the through hole 25, a spring member 22, and a bush 23. The holding pin 21 includes the head portion 21*a*, a flange portion 21*b* having a diameter larger than that of the head portion 21*a*, and a leg portion 21*c* having a diameter smaller than that of the flange portion 21*b*. The holding pin 21 has a shape symmetric with respect to an axis with the head portion 21*a*, the flange portion 21*b*, and the leg portion 21*c* connected coaxially. The spring member 22 is a coil spring and energizes the holding pin 21. The bush 23 is a cylindrical member made of metal and supports the spring member 22 at a first end portion 23*a* thereof while press-fitted in the through hole 25.

A structure and arrangement of the holding pin 21, the spring member 22, and the bush 23 of the second embodiment are the same as those of the holding pin 21, the spring member 22, and the bush 23 of the first embodiment. Comparison with the first embodiment shows that the through hole 25 of the second embodiment is different from the through hole 24 of the first embodiment.

In the second embodiment, the through hole 25 includes a wide diameter portion 25*d*. There is a clearance between the bush 23 and the wide diameter portion 25*d* and therebelow. An inner diameter of the second opening 25*b* is thus larger than an outer diameter of the bush 23 and a second end portion 23*b* of the bush 23 does not come into contact with the second opening 25*b*.

In FIG. 3, the entire length of the bush 23 is press-fitted and fixed in the through hole 24 in the falling prevention mechanism of the first embodiment. Press-fitting the bush 23 results in tensile stress applied to the through hole 24. This tensile stress remains even after press-fitting of the bush 23 and is especially large in the vicinity of the second end portion 23*b* of the bush 23. It is known that torsion breakage occurs from a surface of a material. In the falling prevention mechanism illustrated in FIG. 3, the second end portion 23*b* is in contact with the lower surface 20*b* of the tool mounter 20 and thus this possibly induce deterioration of strength against torsion breakage of the lower surface 20*b* around the second end portion 23*b*. Especially when the power tool 1 is an impact rotary tool, the output shaft 8 receives stroke impact repeatedly and thus the lower surface 20*b* around the second end portion 23*b* includes the risk of torsion breakage due to the remaining tensile stress and the stroke impact. It is preferable to mitigate influence of the tensile stress remaining around the second end portion 23*b* and to enhance strength against torsion breakage of the lower surface 20*b*.

In the second embodiment, therefore, the through hole 25 is formed such that the second end portion 23*b* and the lower surface 20*b* do not come into contact with each other. As illustrated in FIG. 5, the wide diameter portion 25*d* is formed below a position of the first end portion 23*a* of the inserted bush 23, thereby forming a clearance between the bush 23 and the through hole 25 over an interval from the wide diameter portion 25*d* to the second opening 25*b*. Avoiding contact between the second end portion 23*b* of the bush 23 and the second opening 25*b* results in mitigation of influence of tensile stress by the press-fitted bush 23 on the lower surface 20*b*. This allows for enhancing the strength against torsion breakage around the second opening 25*b*.

Note that holding power of the bush 23 in the through hole 25 is dependent on the length of the bush 23 press-fitted therein and thus holding power of the bush 23 illustrated in FIG. 5 is lower than holding power of the bush 23 illustrated in FIG. 3. The holding power of the bush 23 is, however, sufficient if it is more than or equal to a predetermined value. Thus there is no problem with shortening the press-fitted length as long as the holding power is more than or equal to the predetermined value. When including the wide diameter portion 25*d* results in the holding power of the bush 23 not reaching the predetermined value, for example the wide diameter portion 25*d* may be formed at a position closer to the lower surface 20*b* or the diameter of the bush 23 may be slightly increased.

In the second embodiment the inner diameter of the second opening 25*b* is set larger than the outer diameter of the second end portion 23*b*, thereby forming the clearance between the second end portion 23*b* and the lower surface 20*b*. In a variation, for example in the through hole 24 illustrated in FIG. 3, contact between the second end portion 23*b* and the lower surface 20*b* may be avoided by pushing the second end portion 23*b* above the lower surface 20*b*.

Figure 6:
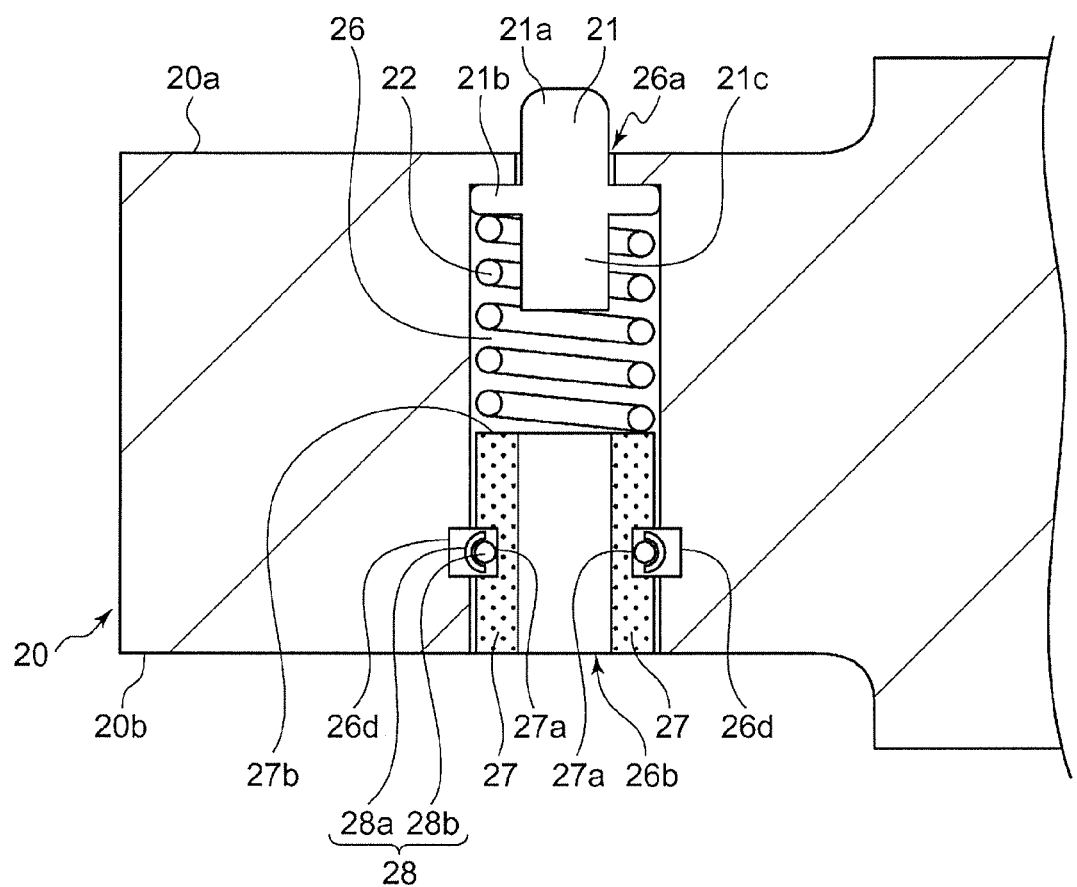
FIG. 6 is a diagram of a structure of a falling prevention mechanism according to one embodiment.

FIG. 6 is a diagram illustrating a structure of a falling prevention mechanism according to a third embodiment. In a tool mounter 20, a through hole 26 has a round cross-section and is formed in a direction perpendicular to a direction of rotation axis. The tool mounter 20 has a quadratic prism shape extending in the direction of rotation axis and the through hole 26 may be formed while vertically penetrating an upper surface 20*a* and a lower surface 20*b* opposite to each other. In the illustrated example, an opening on the upper surface 20*a* side where a head portion 21*a* of a holding pin 21 protrudes from is referred to as a "first opening 26*a*" while an opening on the lower surface 20*b* side is referred to as a "second opening 26*b*". A diameter of the first opening 26*a* is smaller than a diameter of the second opening 26*b*.

The falling prevention mechanism of the third embodiment includes the through hole 26, the holding pin 21 disposed within the through hole 26, a spring member 22, and a ring-shaped supporting member 27. The holding pin 21 includes the head portion 21*a*, a flange portion 21*b* having a diameter larger than that of the head portion 21*a*, and a leg portion 21*c* having a diameter smaller than that of the flange portion 21*b*. The holding pin 21 has a shape symmetric with respect to an axis with the head portion 21*a*, the flange portion 21*b*, and the leg portion 21*c* connected coaxially. The spring member 22 is a coil spring and energizes the holding pin 21. The ring-shaped supporting member 27 is a cylindrical member made of metal or resin and is engaged with the through hole 26 by an elastic member 28. The ring-shaped supporting member 27 supports the spring member 22 at an end portion 27b thereof.

A structure and arrangement of the holding pin 21 and the spring member 22 of the third embodiment are the same as those of the holding pin 21 and the spring member 22 of the first embodiment. Comparison with the first embodiment shows that the through hole 26 of the third embodiment is different from the through hole 24 of the first embodiment and that the ring-shaped supporting member 27 of the third embodiment is different from the bush 23 press-fitted in the through hole 26.

In the falling prevention mechanism of the third embodiment, the ring-shaped supporting member 27 is engaged with the through hole 26 by the elastic member 28. Since the ring-shaped supporting member 27 is different from the bush press-fitted in the through hole 26, there is no issue related to tensile stress due to press-fitting of the bush.

The through hole 26 includes a first groove portion 26d formed on an inner surface thereof in a circumferential direction. The ring-shaped supporting member 27 includes a second groove portion 27a formed on an outer surface thereof in a circumferential direction. Providing the elastic member 28 in the second groove portion 27a and allowing the elastic member 28 to be engaged with the first groove portion 26d, the ring-shaped supporting member 27 is held within the through hole 26.

The elastic member 28 includes a C-letter shaped ring 28a made of metal. The C-letter shaped ring 28a is a C-letter shaped spring formed by curving a metal wire of a predetermined length into a round shape. An inner diameter of the C-letter shaped ring 28a is set smaller than an outer diameter of the ring-shaped supporting member 27 (outer diameter of a portion where the second groove portion 27a is not formed) while an outer diameter of the C-letter shaped ring 28a is set larger than an inner diameter of the second opening 26b.

The falling prevention mechanism of the third embodiment is formed by inserting the holding pin 21 and the spring member 22 from the second opening 26b into the through hole 26 and then inserting the ring-shaped (cylindrical) supporting member 27 disposed with the C-letter shaped ring 28a into the second groove portion 27a from the second opening 26b. Here, the entire periphery of the C-letter shaped ring 28a is pressed against the second groove portion 27a, thereby causing the C-letter shaped ring 28a to shrink and causing an outer diameter of the C-letter shaped ring 28a to be smaller than an inner diameter of the second opening 26b. This allows the ring-shaped supporting member 27 to be inserted from the second opening 26b. When the second groove portion 27a is inserted to a position of the first groove portion 26d of the through hole 26, the shrunk C-letter shaped ring 28a extends to its original diameter. As a result of this, the C-letter shaped ring 28a become engaged with both of the first groove portion 26d of the through hole 26 and the second groove portion 27a of the ring-shaped supporting member 27. Allowing the C-letter shaped ring 28a to be engaged with the first groove portion 26d and the second groove portion 27a results in the ring-shaped supporting member 27 to be held within the through hole 26.

For enhancing engaging power of the C-letter shaped ring 28a, an O ring 28b made of resin such as rubber may be used in combination with the C-letter shaped ring 28a. As illustrated in FIG. 6, a cross-section of the C-letter shaped ring 28a may cover that of the O ring 28b on an inner side in the radial direction. The elastic member 28 where the C-letter shaped ring 28a and the O ring 28b are combined may be engaged with the first groove portion 26d and the second groove portion 27a. Forming the elastic member 28 from the C-letter shaped ring 28a and the O ring 28b allows for enhancing engaging power of the elastic member 28.

In this manner, according to the falling prevention mechanism of the third embodiment, the strength against torsion breakage of the tool mounter 20 can be maintained high since no tensile stress due to the press-fitted bush remains in the tool mounter 20 with the elastic member 28 holding the ring-shaped supporting member 27 in the through hole 26.

Figure 7:
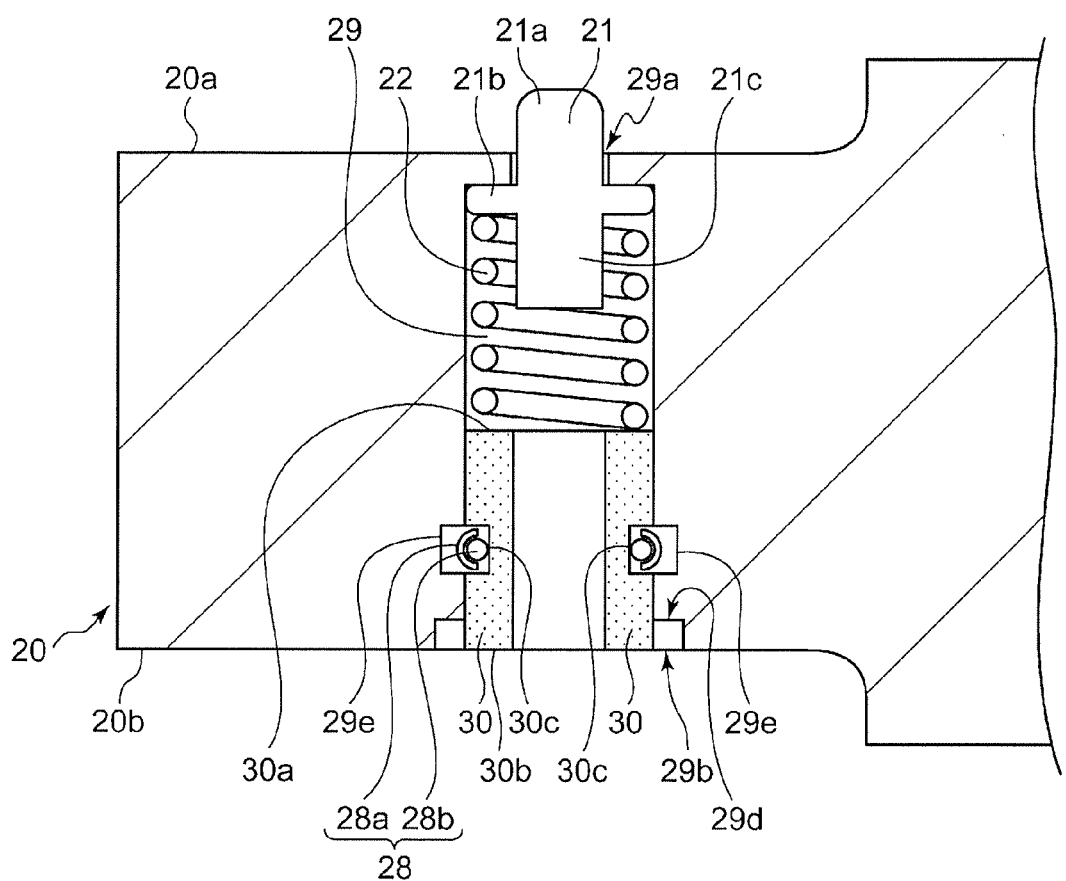
FIG. 7 is a diagram of a structure of a falling prevention mechanism according to one embodiment.

FIG. 7 is a diagram illustrating a structure of a falling prevention mechanism according to a fourth embodiment. In a tool mounter 20, a through hole 29 has a round cross-section and is formed in a direction perpendicular to a direction of rotation axis. The tool mounter 20 has a quadratic prism shape extending in the direction of rotation axis and the through hole 29 may be formed while vertically penetrating an upper surface 20a and a lower surface 20b opposite to each other. In the illustrated example, an opening on the upper surface 20a side where a head portion 21a of a holding pin 21 protrudes from is referred to as a "first opening 29a" while an opening on the lower surface 20b side is referred to as a "second opening 29b". A diameter of the first opening 29a is smaller than a diameter of the second opening 29b.

The falling prevention mechanism of the fourth embodiment includes the through hole 29, the holding pin 21 disposed within the through hole 29, a spring member 22, and a bush 30. The holding pin 21 includes the head portion 21a, a flange portion 21b having a diameter larger than that of the head portion 21a, and a leg portion 21c having a diameter smaller than that of the flange portion 21b. The holding pin 21 has a shape symmetric with respect to an axis with the head portion 21a, the flange portion 21b, and the leg portion 21c connected coaxially. The spring member 22 is a coil spring and energizes the holding pin 21. The bush 30 is a cylindrical member made of metal and supports the spring member 22 at a first end portion 30a thereof while press-fitted in the through hole 29.

The falling prevention mechanism of the fourth embodiment includes the structures of both of the falling prevention mechanism of the second embodiment and the falling prevention mechanism of the third embodiment. In the fourth embodiment, the through hole 29 includes a wide diameter portion 29d. There is a clearance between the bush 30 and the wide diameter portion 29d and therebelow. An inner diameter of the second opening 29b is thus larger than an outer diameter of the bush 30 and a second end portion 30b of the bush 30 does not come into contact with the second opening 29b.

In the fourth embodiment, therefore, the through hole 29 is formed such that the second end portion 30b and the lower surface 20b do not come into contact with each other. As illustrated in FIG. 7, the wide diameter portion 29d is formed below a position of the first end portion 30a of the inserted bush 30, thereby forming a clearance between the bush 30 and the through hole 29 over an interval from the wide diameter portion 29d to the second opening 29b. Avoiding contact between the second end portion 30b of the bush 30 and the second opening 29b results in mitigation of influence of tensile stress by the press-fitted bush 30 on the lower surface 20b. This allows for enhancing the strength against torsion breakage around the second opening 29b.

In the fourth embodiment, the bush 30 is engaged with the through hole 29 by an elastic member 28. The through hole 29 includes a first groove portion 29e formed on an inner surface thereof in a circumferential direction. Meanwhile the bush 30 includes a second groove portion 30c formed on an outer surface thereof in a circumferential direction. Providing the elastic member 28 in the second groove portion 30c and allowing the elastic member 28 to be engaged with the first groove portion 29e, holding power of the bush 30 with respect to the through hole 29 can be enhanced.

The holding function of the bush 30 of the elastic member 28 supports press-fitting holding power of the bush 30 with respect to the through hole 29. As described in the third embodiment, the elastic member 28 includes the C-letter shaped ring 28a made of metal. An inner diameter of the C-letter shaped ring 28a is set smaller than an outer diameter of the bush 30 while an outer diameter of the C-letter shaped ring 28a is set larger than an inner diameter of the second opening 29b. For enhancing engaging power of the C-letter shaped ring 28a, an O ring 28b made of resin may be used in combination with the C-letter shaped ring 28a.

In the falling prevention mechanism of the fourth embodiment the entire length of the bush 30 is not press-fitted in the through hole 29 and thus it is suitable to enhance holding power of the bush 30 with respect to the through hole 29 by using the elastic member 28. Enhancing the holding power of the bush 30 by using the elastic member 28 also allows for design to mitigate press-fitting holding power of the bush 30, thereby allowing for enhancing the strength against torsion breakage of the lower surface 20b.

An overview of an embodiment of the present invention is as follows.

A power tool (1) of an embodiment of the present invention includes a tool mounter (20) to which a tip tool (40) is mounted. The tool mounter (20) is formed with a through hole (25, 29) in a direction different from a shaft direction. The through hole is disposed with: a holding pin (21) that protrudes from a first opening (25a, 29a) of the through hole, enters a hole (43) formed in the tip tool, and thereby holds the tip tool; a spring member (22) that energizes the holding pin; and a bush (23, 30) press-fitted in the through hole and supporting the spring member at a first end portion (23a, 30a) thereof. A second end portion (23b, 30b) of the bush (23, 30) is arranged to avoid contact with the second opening (25b, 29b) of the through hole.

An inner diameter of a second opening (25b, 29b) of the through hole is preferably formed larger than an outer diameter of the bush (23, 30). An outer surface of the bush (30) may be formed with a groove portion (30c) in a circumferential direction. The groove portion may be provided with an elastic member (28) and the elastic member may be engaged with the through hole (29).

A power tool (1) of another embodiment of the present invention includes a tool mounter (20) to which a tip tool (40) is mounted. The tool mounter (20) is formed with a through hole (26) in a direction different from a shaft direction. The through hole is disposed with: a holding pin (21) that protrudes from an opening (26a) of the through hole, enters a hole (43) formed in the tip tool, and thereby holds the tip tool; a spring member (22) that energizes the holding pin; and a supporting member (27) supporting the spring member. A groove portion (27a) is formed on an outer surface of the supporting member in a circumferential direction. An elastic member (28) is arranged in the groove portion and engaged with the through hole (26).

A groove portion (26d) is formed on an inner surface of the through hole (26) in a circumferential direction. Engagement of the elastic member (28) with the groove portion (26d) of the through hole and the groove portion (27a) of the supporting member results in maintaining the supporting member in the through hole. The elastic member (28) preferably includes a C-letter shaped ring (28a) made of metal.

One aspect of the present invention has been described above based on the embodiments. These embodiments are merely examples. Therefore, it should be understood by a person skilled in the art that combinations of the components or processing processes of the examples may include various variations and that such a variation is also within the scope of the present teachings.

In the embodiment, the power tool 1 which is an electric power tool including the tool mounter 20 to which a tip tool is mounted has been described; however, the power tool 1 is merely an example of a power tool including the tool mounter 20. The power tool may be, other than the electric power tools, for example a pneumatic-tool powered by compressed air or a hydraulic tool powered by hydraulic pressure including the tool mounter 20.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A power tool, comprising a tool mounter to which a tip tool is mounted,
    wherein the tool mounter is formed with a through hole in a direction different from a shaft direction,
    the through hole is disposed with: a holding pin that protrudes from a first opening of the through hole, enters a hole formed in the tip tool, and holds the tip tool; a spring member that energizes the holding pin; and a bush press-fitted in the through hole and supporting the spring member at a first end portion thereof, and
    a second end portion of the bush is not in contact with a second opening of the through hole.

2. The power tool according to claim 1,
    wherein an inner diameter of the second opening of the through hole is formed larger than an outer diameter of the bush.

3. The power tool according to claim 1,
    wherein an outer surface of the bush is formed with a groove portion in a circumferential direction,
    the groove portion is provided with an elastic member, and
    the elastic member is engaged with the through hole.

4. A power tool, comprising a tool mounter to which a tip tool is mounted,
    wherein the tool mounter is formed with a through hole in a direction different from a shaft direction,
    the through hole is disposed with: a holding pin that protrudes from an opening of the through hole, enters a hole formed in the tip tool, and holds the tip tool; a spring member that energizes the holding pin; and a supporting member that supports the spring member,
    a groove portion is formed on an outer surface of the supporting member in a circumferential direction,
    an elastic member is arranged in the groove portion and engaged with the through hole.

5. The power tool according to claim 4,
wherein a groove portion is formed on an inner surface of the through hole in a circumferential direction, and
engagement of the elastic member with the groove portion of the through hole and the groove portion of the supporting member results in maintaining the supporting member in the through hole.

6. The power tool according to claim 4,
wherein the elastic member includes a C-letter shaped ring made of metal.

\* \* \* \* \*